US008369609B2

(12) United States Patent
Xu

(10) Patent No.: US 8,369,609 B2
(45) Date of Patent: Feb. 5, 2013

(54) REDUCED-COMPLEXITY DISPARITY MAP ESTIMATION

(75) Inventor: Sanbao Xu, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 448 days.

(21) Appl. No.: 12/697,599

(22) Filed: Feb. 1, 2010

(65) Prior Publication Data

US 2011/0188736 A1   Aug. 4, 2011

(51) Int. Cl.
*G06K 9/00*   (2006.01)
(52) U.S. Cl. ........ 382/154; 382/195; 382/199; 348/155; 348/208.13; 348/413.1; 345/613; 375/240.12; 396/324
(58) Field of Classification Search .................. None
See application file for complete search history.

(56) References Cited

U.S. PATENT DOCUMENTS

| 2003/0231792 A1* | 12/2003 | Zhang et al. | 382/154 |
|---|---|---|---|
| 2004/0109585 A1* | 6/2004 | Tao et al. | 382/106 |
| 2004/0240725 A1* | 12/2004 | Xu et al. | 382/154 |
| 2005/0123190 A1* | 6/2005 | Zhang et al. | 382/154 |
| 2005/0123191 A1* | 6/2005 | Zhang et al. | 382/154 |
| 2005/0163366 A1* | 7/2005 | Zhang et al. | 382/154 |
| 2005/0163367 A1* | 7/2005 | Zhang et al. | 382/154 |
| 2006/0193509 A1* | 8/2006 | Criminisi et al. | 382/154 |
| 2009/0067705 A1* | 3/2009 | Yu et al. | 382/154 |

OTHER PUBLICATIONS

Bergen, J. R. et al. "Hierarchical Model-Based Motion Estimation." Proceedings of the Second European Conference on Computer Vision, vol. 588, 1992, pp. 237-252.
Comaniciu, D. et al. "Mean Shift Analysis and Applications." Proceedings of the International Conference on Computer Vision, vol. 2, 1999, p. 1197.
Henkel, R. D. "Stereovision by Coherence-Detection." Publication date unknown. Availabe on-line at: http://axon.physik.uni-bremen.de/research/stereo/tyc/node1.html.
Kanade, T. et al. "A Stereo Matching Algorithm with an Adaptive Window: Theory and Experiment." IEEE International Conference on Robots and Automation, Sacramento, CA, US, Apr. 1991.
Lee, S. H. et al. "Hierarchical Stochastic Diffusion for Disparity Estimation." IEEE Workshop on Stereo and Multi-Baseline Vision (SMBV'01), Kauai, Hawaii, Dec. 9-10, 2001. (Abstract only).
Marr, D. et al. "Cooperative Computation of Stereo Disparity." Science, New Series, vol. 194, No. 4262, Oct. 15, 1976.
Quam, L. H. "Hierarchical Warp Stereo." SRI International, Technical Note No. 402, Dec. 11, 1986.
Scharstein, D. et al. "A Taxonomy and Evaluation of Dense Two-Frame Stereo Correspondence Algorithms." Proceedings of the Second European Conference on Computer Vision, vol. 588, 1992.

(Continued)

*Primary Examiner* — John Lee
(74) *Attorney, Agent, or Firm* — Coats & Bennett, P.L.L.C.

(57) ABSTRACT

Image processing herein reduces the computational complexity required to estimate a disparity map of a scene from a plurality of monoscopic images. Image processing includes calculating a disparity and associated matching cost for at least one pixel block in a reference image, and then predicting, based on this disparity and associated matching cost, a disparity and associated matching cost for a pixel block that neighbors the at least one pixel block. Image processing continues with calculating a tentative disparity and associated matching cost for the neighboring pixel block, by searching for a corresponding pixel block in a different monoscopic image over a reduced range of candidate pixel blocks focused around the disparity predicted. Searching over a reduced range avoids significant computational complexity. Image processing concludes with determining the disparity for the neighboring pixel block based on comparing the matching costs associated with the tentative disparity and the disparity predicted.

24 Claims, 6 Drawing Sheets

OTHER PUBLICATIONS

Sizintsev, M. et al. "Coarse-to-Fine Stereo Vision wiht Accurate 3-D Boundaries." York University, Technical Report CS-2006-07, Jun. 28, 2006.

Sun, C. "Fast Stereo Matching using Rectangular Subregioning and 3D Maximum-Surface Techniques." International Journal of Computer Vision, vol. 47, No. 1/2/3, May 2002, pp. 99-117.

Szeliski, R. "Computer Vision: Algorithms and Applications." Jun. 19, 2009. Available online at: http://research.microsoft.com/en-us/um/people/szeliski/Book/drafts/SzeliskiBook_20090619_draft.pdf.

Wang, Z.-F. et al. "A Region Based Stereo Matching Algorithm using Cooperative Optimization." 2008 IEEE Conference on Computer Vision and Pattern Recognition, Anchorage, AK, USA, Jun. 23-28, 2008.

Xu, X. et al. "Fast Disparity Motion Estimation in MVC Based on Range Prediction." 15th IEEE International Conference on Image Processing, 2008 (ICIP 2008), San Diego, CA, US, Oct. 12-15, 2008.

Zach, C. et al. "Hierarchical Disparity Estimation with Programmable 3D Hardware." WSCG SHORT Communication papers proceedings (WSCG'2004), Plzen, Czech Republic, Feb. 2-6, 2004.

Zitnick, C. L. et al. "A Cooperative Algorithm for Stereo Matching and Occlusion Detection." IEEE Transactions on Pattern Analysis and Machine Intelligence, vol. 22, No. 7, Jul. 2000.

Owens, R. "Stereo Matching." Oct. 29, 1997. Available online at: http://homepages.inf.ed.ac.uk/rbf/CVonline/LOCAL_COPIES/OWENS/LECT11/node5.html.

* cited by examiner

REDUCED-COMPLEXITY DISPARITY MAP ESTIMATION

TECHNICAL FIELD

The present invention generally relates to estimating a disparity map of a scene, and particularly relates to reducing the complexity of disparity map estimation using disparity prediction.

BACKGROUND

The ability to perceive a real-world scene in three dimensions finds particular utility in applications like computer vision, 3D video, 3D modeling, image-based rendering, intelligent transportation, and many others. Because only limited information about the depth of objects in a scene can be obtained from a single monoscopic image of that scene, 3D perception of a scene is often obtained using two or more monoscopic images of the scene. When the two or more monoscopic images are taken from different visual perspectives of the scene, for example, the absolute depth of objects in the scene can be derived.

Each of these monoscopic images may include a plurality of pixel blocks for depicting the scene at some given pixel block resolution, where a pixel block in turn includes one or more individual picture elements (pixels). Because the monoscopic images are taken of the same scene, a pixel block in one image may correspond to the same real-world object depicted by a pixel block in the other image(s). Yet because the monoscopic images are taken from different visual perspectives of the scene, these corresponding pixel blocks may be located at different positions within the images. That is, the position of a pixel block depicting an object in one image may be offset (horizontally and/or vertically) relative to the position of a pixel block corresponding to that same object in another image. This relative offset between corresponding pixel blocks is referred to as the disparity between those pixel blocks. The collection of disparities between all corresponding pixel blocks represents a disparity map of the scene.

The disparity between corresponding pixel blocks is inversely proportional to the depth of the object that they depict (i.e., the greater the offset in the position of an object when viewed from different perspectives, the closer the object). From a disparity map of a scene, therefore, one can derive a depth map of the scene, which identifies the depth of all objects in the scene. Thus, a common approach to obtaining 3D perception of a scene involves first estimating a disparity map of a scene, and then deriving from that disparity map a depth map of the scene.

However, the computational complexity involved in estimating a disparity map of a scene is generally quite high. The search for corresponding pixel blocks contributes to much of this computational complexity. For example, some conventional searching approaches define one of the monoscopic images as a reference image and search the other monoscopic image(s) for pixel blocks that correspond to those in the reference image. Notably, to search another image for a pixel block that corresponds to a given pixel block in the reference image, these conventional approaches search for the corresponding pixel block over a full range of candidate pixel blocks. The range is a full range in the sense that it includes all pixel blocks in the other image that might possibly correspond to the pixel block in the reference image, given some maximum possible disparity for the scene (which can be quite large, e.g., over a hundred pixels). To determine which of these candidate pixel blocks corresponds to the pixel block in the reference image, conventional approaches calculate a matching cost for each candidate pixel block that indicates how similar or dissimilar that candidate pixel block is to the pixel block in the reference image. The matching costs are then evaluated to determine which candidate pixel block has a matching cost indicating the most similarity to the pixel block in the reference image; this candidate pixel block is determined as the corresponding pixel block.

Conventional approaches perform such a full range search independently for each pixel block in the reference image, which helps to ensure that the disparity map estimated is accurate. However, this accuracy comes at the expense of significant computational complexity, since performing so many full range searches requires conventional approaches to calculate a very large number of matching costs. As a result of this computational complexity, most conventional approaches cannot be implemented on devices with limited image processing or memory storage capabilities. The computational complexity of conventional approaches also limits the speed at which they can estimate a disparity map, restricting them to applications that do not require real-time 3D perception.

Various known improvements to conventional approaches attempt to accelerate the disparity map estimation process. See, e.g., C. Zach, K. Kramer, and H. Bischof, "Hierarchical Disparity Estimation with Programmable 3D Hardware," *The $12^{th}$ International Conference in Central Europe on Computer Graphics, Visualization, and Computer Vision* '2004, (which describes refining disparity maps estimated at coarse pixel block resolutions to obtain disparity maps with finer resolution). Yet these known improvements sacrifice the accuracy of the disparity map estimated, since fine spatial details of the disparity map are often lost.

SUMMARY

Teachings presented herein advantageously reduce the computational complexity required to estimate a disparity map of a scene from a plurality of monoscopic images. Instead of performing a full range search for each pixel block in a reference image, the teachings use disparity prediction to reduce the search range for some pixel blocks. By reducing the search range for some pixel blocks, the teachings calculate fewer matching costs than conventional approaches and thereby require less computational complexity.

More particularly, a method of estimating a disparity map of a scene as taught herein includes calculating a disparity and an associated matching cost for at least one pixel block (e.g., a first pixel block) included in the reference image at a pre-determined pixel block resolution. In one embodiment, this entails searching for a corresponding pixel block in a different monoscopic image over a full range of candidate pixel blocks, to ensure the disparity on which subsequent predictions will be based are accurate. The method then uses that disparity and associated matching cost to predict the disparity and associated matching cost for a second pixel block included in the reference image, namely one that neighbors the first pixel block. That is, the method further includes predicting, based on the disparity and the associated matching cost calculated for the first pixel block, a disparity and an associated matching cost for a neighboring pixel block that is included in the reference image at the pre-determined pixel block resolution and that neighbors the first pixel block.

In many cases, the prediction is appropriate, since most neighboring pixel blocks depict the same real-world object and therefore have similar disparities and associated matching costs. In some cases, however, neighboring pixel blocks lie on or close to depth discontinuous edges, meaning that those pixel blocks will not have similar disparities and associated matching costs, and that the prediction is not appropriate. Accordingly, to determine if the prediction is appropriate, the method continues by performing a limited (i.e., reduced) search around the predicted disparity; that is, the method searches for a corresponding pixel block within a reduced range of candidate pixel blocks focused around the predicted disparity. The results of this reduced search are referred to as a so-called "tentative disparity" and an associated matching cost for the neighboring pixel block. The "tentative disparity" is the disparity that, if the prediction turns out to be appropriate, will be set as the disparity ultimately estimated for the neighboring pixel block. The matching cost associated with the tentative disparity will be used to determine if the prediction is appropriate. Specifically, if the prediction is appropriate, the matching cost associated with the tentative disparity will be similar to the matching cost associated with the predicted disparity.

Thus, the method determines the disparity for the neighboring pixel block based on comparing the matching costs associated with the tentative disparity and the disparity predicted. In some embodiments, for example, the method includes determining whether the difference between the matching cost associated with the tentative disparity and the matching cost associated with the disparity predicted is greater than, less than, or equal to a pre-determined threshold. If this difference is less than or equal to the threshold, the tentative disparity calculated is a good estimate and the method continues by determining the disparity for the neighboring pixel block as the tentative disparity. If the difference is greater than the threshold, the tentative disparity calculated is not a good estimate. In this case, the method broadens the search for the block's disparity beyond the reduced range. That is, the method calculates the disparity for the neighboring pixel block by searching for a corresponding pixel block in the different monoscopic image over the full range of candidate pixel blocks.

Notably, the method described above for estimating a disparity map requires reduced computational complexity as compared to known approaches. Indeed, substantial computational complexity is avoided for most pixel blocks in the reference image, since for most pixel blocks the method searches over only a reduced range of candidate pixel blocks. Moreover, for those few pixel blocks in the reference image that require resort to searching over the full range of candidate pixel blocks, only a moderate amount of additional computational complexity is incurred, since computations already performed over the reduced range need not be performed again.

Teachings presented herein also include one or more image processing circuits configured to carry out the method described above, and various other embodiments. Thus, the present invention is not limited to the above features and advantages. Indeed, those skilled in the art will recognize additional features and advantages upon reading the following detailed description, and upon viewing the accompanying drawings.

DETAILED DESCRIPTION

Figure 1:
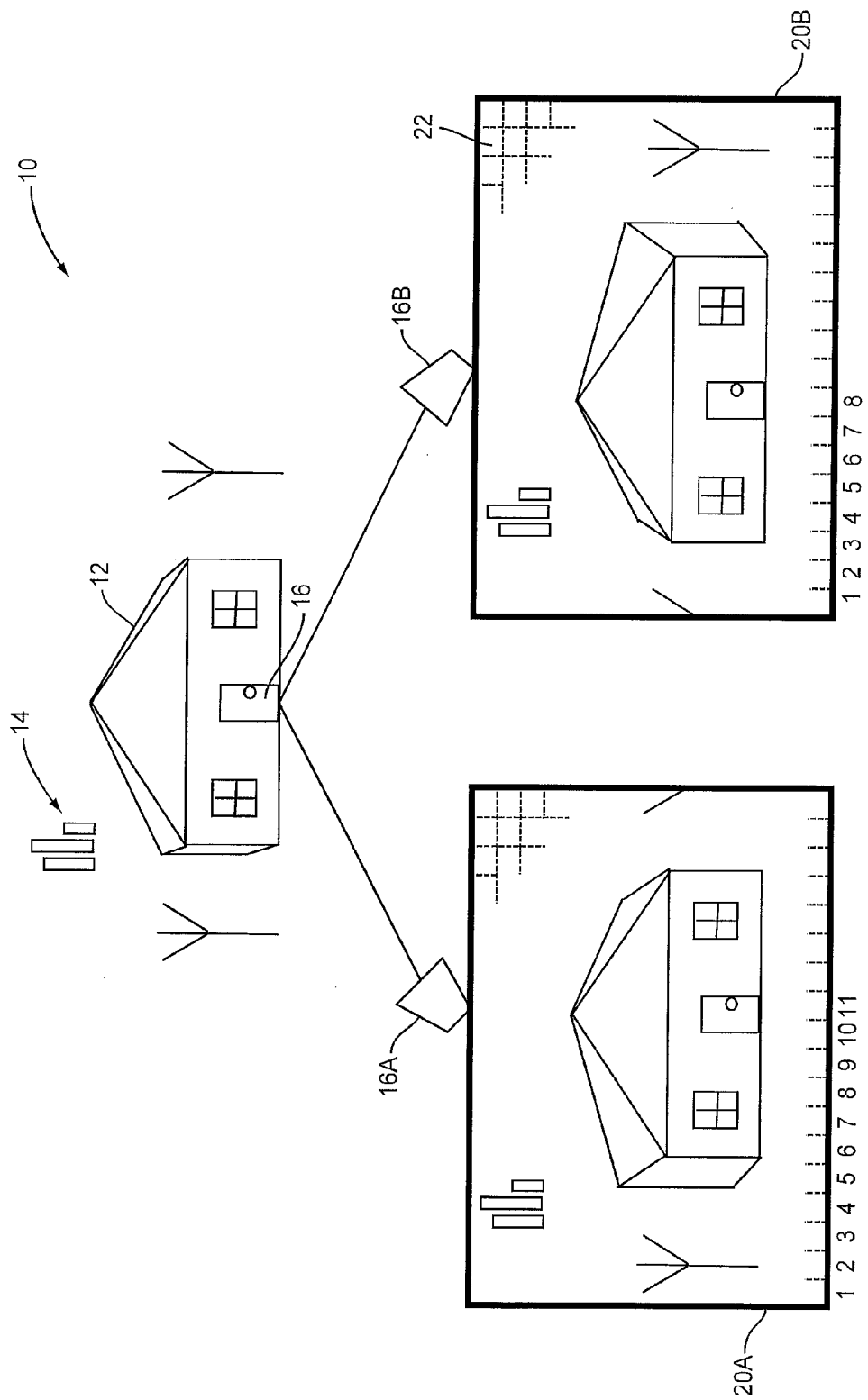
FIG. 1 illustrates an example of a real-world scene and a plurality of monoscopic images of that scene.

FIG. 1 illustrates a simplified example of a real-world scene 10. The real-world scene 10 as shown includes a house 12 in the foreground and a city 14 in the distant background. FIG. 1 also illustrates two monoscopic images 20A, 20B of the scene 10. The monoscopic images 20A, 20B are acquired from different visual perspectives of the scene 10, such as by two physically displaced cameras 16A, 16B.

The monoscopic images 20A, 20B each include a plurality of pixel blocks 22 arranged, e.g., in rows and columns for depicting the scene 10. A pixel block 22, as used herein, may include any number of individual pixels, whether that be one or more. Regardless, each of the monoscopic images 20A, 20B may capture the scene 10 at some original pixel block resolution (e.g., a resolution that includes 1600 pixel blocks per row by 1200 pixel blocks per column). It should be noted, however, that these original images can then be repeatedly filtered and subsampled to generate copies of the images at progressively reduced pixel block resolutions (e.g., one copy at a resolution that includes only 1024 pixel blocks by 768 pixel blocks, another copy at a resolution that includes only 640 pixel blocks by 480 pixel blocks, and so on). In general, therefore, each of the monoscopic images 20A, 20B can in fact depict the scene 10 at various pixel block resolutions. Notwithstanding this fact, the image processing taught herein and the description below generally involve only one of these possible pixel block resolutions, whether it be the original resolution or some reduced resolution. Accordingly, any comparison between monoscopic images 20A, 20B described below involves monoscopic images 20A, 20B at the same resolution; likewise any relationship described between pixel blocks within one monoscopic image involves pixel blocks that are included in the monoscopic image at the same resolution.

With this understanding, because the images 20A, 20B are acquired from different visual perspectives of the scene 10, the position of the pixel blocks 22 depicting one of the scene's objects in image 20B may be offset with respect to the position of the pixel blocks 22 corresponding to that same object in image 20A. This offset will be limited to the horizontal direction (i.e., across columns, not rows, of pixel blocks) if the cameras 16A, 16B were precisely aligned at the same vertical level, or if the images 20A, 20B have been rectified using parameters from the cameras 16A, 16B as provided by e.g., a camera calibration procedure. The pixel blocks 22 depicting the house's door 16 in image 20B, for example, are horizontally offset by 3 pixel blocks as compared to the pixel blocks 22 corresponding to the house's door 16 in image 20A (i.e., while pixel blocks depicting the house's door 16 in both images 20A, 20B are in the same respective row, the pixel blocks depicting the house's door 16 in image 20B are in column 8 rather than in column 11). This offset between corresponding pixel blocks 22 in the images 20A, 20B is referred to as the disparity between those pixel blocks 22.

The disparity between corresponding pixel blocks 22 is often defined with respect to one monoscopic image, denoted as the reference image, so as to provide a sense of direction for the disparity. Arbitrarily denoting image 20A as the reference image 20A in the example above, the disparity for pixel blocks 22 depicting the house's door 16 in the reference image 20A would be −3 pixel blocks, since the corresponding pixel blocks 22 in image 20B are positioned 3 pixel blocks more to the left. The disparity for other pixel blocks 22 in the reference image 20A can be understood in much the same way. Accordingly, the collection of disparities for all pixel blocks 22 in the reference image 20A represents a disparity map of the scene 10.

A disparity map of the scene 10 can be used to derive information about the depth of objects in the scene 10, since disparity is inversely proportional to depth. For example, the disparity for pixel blocks 22 depicting the house's door 16 in the reference image 20A is larger than the disparity for pixel blocks 22 depicting the city 14 in the reference image 20A. This indicates that the house's door 16 is closer to the viewpoint than the city 14, information which is particularly useful for computer vision and many other applications.

Figure 2:
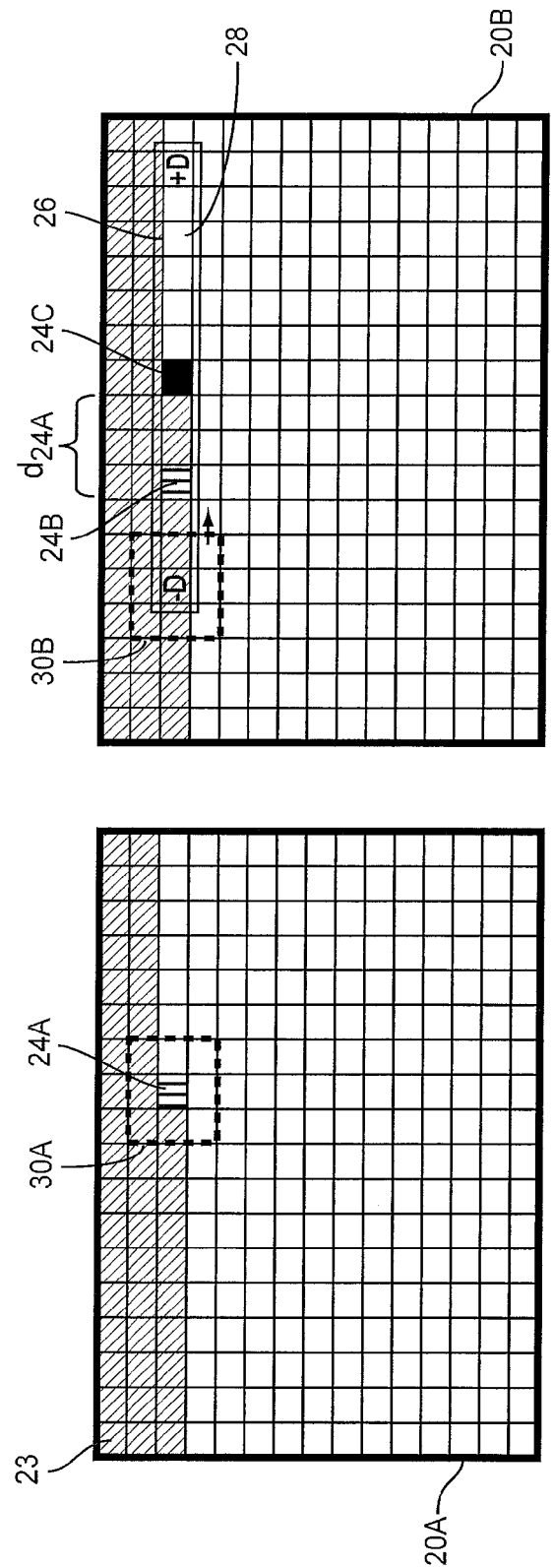
FIG. 2 illustrates a known approach to estimating a disparity map of a scene, by searching for corresponding pixel blocks over a full range of candidate pixel blocks.

FIG. 2 illustrates one known approach for estimating a disparity map of a scene 10. In FIG. 2, the disparity is calculated separately for each pixel block included in the reference image 20A, starting with the upper-leftmost pixel block 23 and moving across the image 20A from left to right and top to bottom. To calculate the disparity for any given pixel block included in the reference image 20A, take for example pixel block 24A, this approach (1) searches for a corresponding pixel block 24B included in the other monoscopic image 20B, and then (2) determines the disparity for pixel block 24A as the horizontal offset $d_{24A}$ between pixel block 24A and the corresponding pixel block 24B. For illustrative purposes, the horizontal offset $d_{24A}$ is shown in FIG. 2 as the offset between pixel block 24C, which has the same respective position in monoscopic image 20B as that of pixel block 24A in the reference image 20A, and the corresponding pixel block 24B.

The search for the corresponding pixel block 24B entails searching for that pixel block 24B over a range 26 of candidate pixel blocks 28 in image 20B. Notably, in known approaches, this range 26 is a "full range" of candidate pixel blocks 28 in that it includes all pixel blocks in image 20B that might possibly correspond to pixel block 24A, given some maximum possible disparity for the scene 10. In the example of FIG. 2, for instance, the maximum possible disparity for the scene 10 is assumed to be ±D pixel blocks (although the maximum possible disparity in this example is assumed to be symmetric in the positive and negative directions, in general this need not be the case). Accordingly, the approach in FIG. 2 searches for the corresponding pixel block 24B amongst all pixel blocks 28 that are positioned within ±D pixel blocks of respective pixel block 24C.

To determine which one of the candidate pixel blocks 28 in image 20B is in fact the pixel block 24B that most closely corresponds to pixel block 24A, a matching cost is calculated for each candidate pixel block 28. The matching cost calculated for a candidate pixel block 28 indicates how similar or dissimilar that block 28 is to the pixel block 24A. This matching cost can be calculated, for instance, based on the absolute (or squared) differences between the intensities of candidate pixel block 28 and pixel block 24A, so as to be a pixel-based matching cost. A window-based matching cost, however, is often used because it is more robust in the presence of radiometric changes and/or noise. A window-based matching cost can be calculated for a candidate pixel block 28 based on the sum of the absolute (or squared) differences between local windows 30B, 30A of pixel blocks centered around the candidate pixel block 28 and the pixel block 24A, respectively. Regardless of the specific type of matching cost calculated for each of the candidate pixel blocks 28, though, the corresponding pixel block 24B is determined as the candidate pixel block 28 with a matching cost indicating the most similarity to pixel block 24A.

Known approaches to estimating a disparity map of a scene 10 calculate a disparity and an associated matching cost (i.e., the matching cost associated with the corresponding pixel block actually used to compute that disparity) as described above for each pixel block in the reference image 20A. That is, known approaches always search for corresponding pixel blocks over a full range of candidate pixel blocks 28, a characteristic which contributes to their computational complexity.

Figure 3:
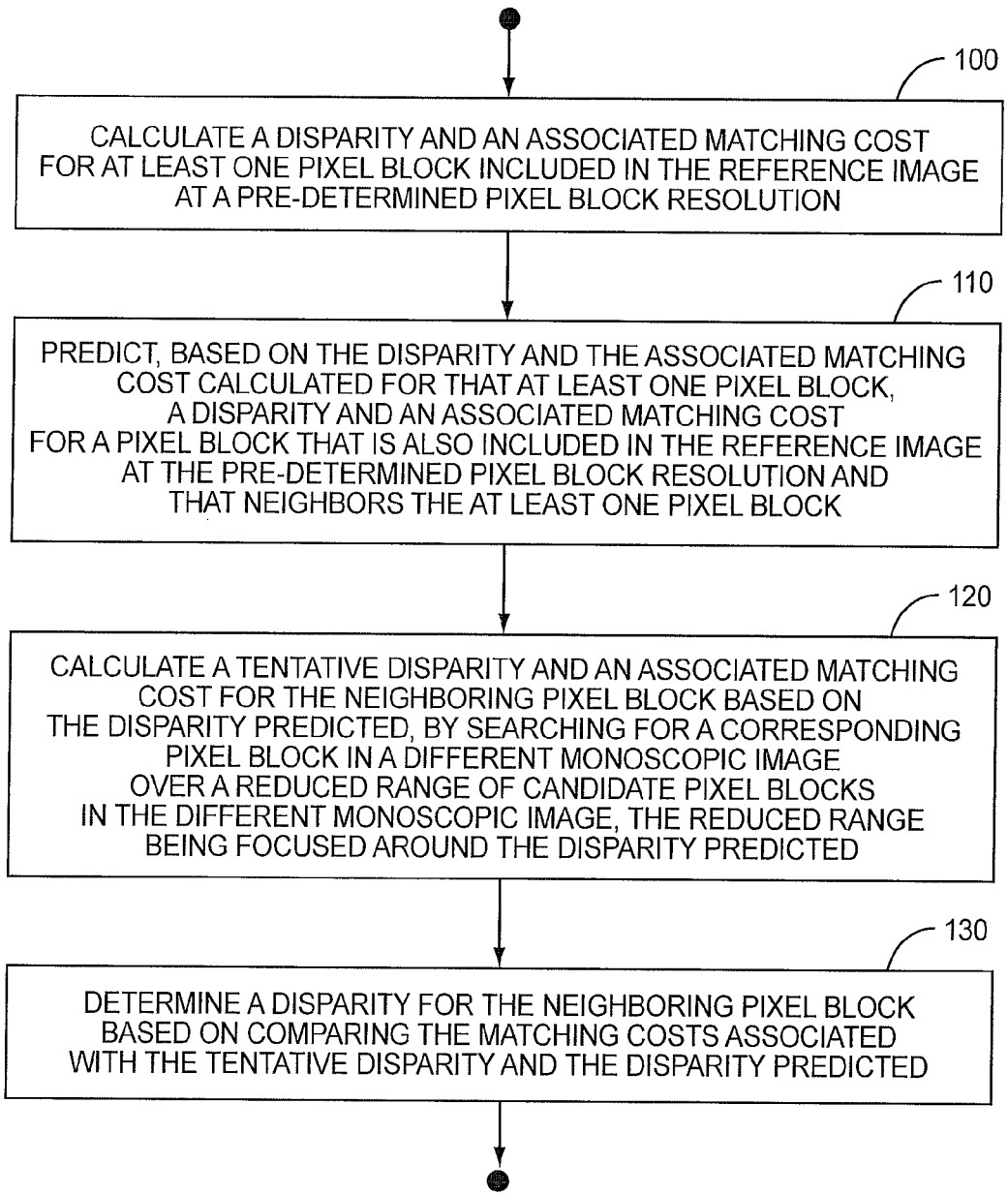
FIG. 3 is a logic flow diagram illustrating one embodiment of a method for estimating a disparity map of a scene, by searching for corresponding pixel blocks over a reduced range of pixel blocks.

Teachings herein advantageously reduce the computational complexity required to estimate a disparity map of a scene 10, by searching for corresponding pixel blocks over a reduced range of candidate pixel blocks 28, at least for some pixel blocks in the reference image 20A. The teachings recognize that neighboring pixel blocks generally have similar intensities, most likely belong to the same real-world object, and thus more often than not have similar disparities. The teachings exploit this characteristic to predict the disparities of neighboring pixel blocks, and to ultimately reduce the range of candidate pixel blocks 28 searched. FIG. 3 illustrates one embodiment of an image processing method for estimating a disparity map of a scene 10 from a plurality of monoscopic images 20A, 20B of that scene, using such disparity prediction.

According to FIG. 3, image processing includes calculating a disparity and an associated matching cost for at least one pixel block included in the reference image 20A at a pre-determined pixel block resolution (Block 100). In one embodiment, this entails searching for a corresponding pixel block in a different monoscopic image 20B over a full range of candidate pixel blocks, much like the known approaches described above. However, regardless of the specific manner in which the disparity and associated matching cost is calculated for the at least one pixel block, the image processing uses that disparity and associated matching cost to predict the disparity and associated matching cost for another pixel block included in the reference image 20A, namely one that neighbors the at least one pixel block. That is, image processing further includes predicting, based on the disparity and the associated matching cost calculated for the at least one pixel block, a disparity and an associated matching cost for a pixel block that is also included in the reference image 20A at the pre-determined pixel block resolution and that neighbors the at least one pixel block (Block 110).

For most neighboring pixel blocks in the reference image 20A, the disparity predicted by the image processing approximately suggests the blocks' actual disparity, or at least the disparity that would have been calculated by searching for a corresponding pixel block over a full range of candidate pixel blocks in image 20B. Again, most neighboring pixel blocks generally have similar intensities, most likely belong to the same real-world object, and thus more often than not have similar disparities. The actual disparity for most neighboring pixel blocks, therefore, will be quite close to the disparity predicted. However, some neighboring pixel blocks included in the reference image 20A, like those that are occluded in image 20B, lie on or close to depth discontinuous edges. The disparity predicted for these neighboring pixel blocks may not approximately suggest the blocks' actual disparity.

Thus, the image processing in FIG. 3 continues by calculating a tentative disparity and an associated matching cost for the neighboring pixel block based on the disparity predicted (Block 120). The tentative disparity and associated matching cost are 'tentative' in the sense that they are subject to confirmation of their accuracy before possibly being assigned as the disparity estimated for the neighboring pixel block. To calculate this tentative disparity and associated matching cost, the image processing searches for a corresponding pixel block in the different monoscopic image 20B over a reduced range of candidate pixel blocks, where the reduced range is focused around the disparity predicted (since as discussed above the actual disparity will likely be close to the disparity predicted). Notably, the range of candidate pixel blocks is referred to as reduced because the range includes fewer candidate pixel blocks than the full range discussed above (i.e., less than the maximum disparity possible for the scene 10).

Having calculated a tentative disparity and an associated matching cost for the neighboring pixel block, the image processing determines the disparity for that block based on comparing the matching costs associated with the tentative disparity and the disparity predicted (Block 130). If the matching costs are similar (e.g., they have the same order of magnitude), the disparity predicted more than likely did in fact approximately suggest the actual disparity of the neighboring pixel block, meaning that the tentative disparity calculated is a good estimate for the block's disparity. Likewise, if the matching costs are quite dissimilar, the disparity predicted more than likely did not approximately suggest the actual disparity of the neighboring pixel block, meaning that the tentative disparity calculated is not a good estimate of the block's disparity.

Accordingly, in some embodiments, image processing includes determining whether the difference between the matching cost associated with the tentative disparity and the matching cost associated with the disparity predicted is greater than, less than, or equal to a pre-determined threshold. If this difference is less than or equal to the threshold, the tentative disparity calculated is a good estimate and image processing continues by determining the disparity for the neighboring pixel block as the tentative disparity. If the difference is greater than the threshold, the tentative disparity calculated is not a good estimate and image processing instead broadens the search for the block's disparity beyond the reduced range. That is, the image processing calculates the disparity for the neighboring pixel block by searching for a corresponding pixel block in the different monoscopic image over the full range of candidate pixel blocks.

Notably, the image processing illustrated in FIG. 3 for estimating a disparity map requires reduced computational complexity as compared to known approaches. Indeed, substantial computational complexity is avoided for most pixel blocks in the reference image 20A, since for most pixel blocks the image processing searches for corresponding pixel blocks in image 20B over a reduced range of candidate pixel blocks. Moreover, for those few pixel blocks in the reference image 20A that require resort to searching over the full range of candidate pixel blocks, little if any additional computational complexity is incurred, since computations already performed over the reduced range need not be performed again.

Figure 4A:
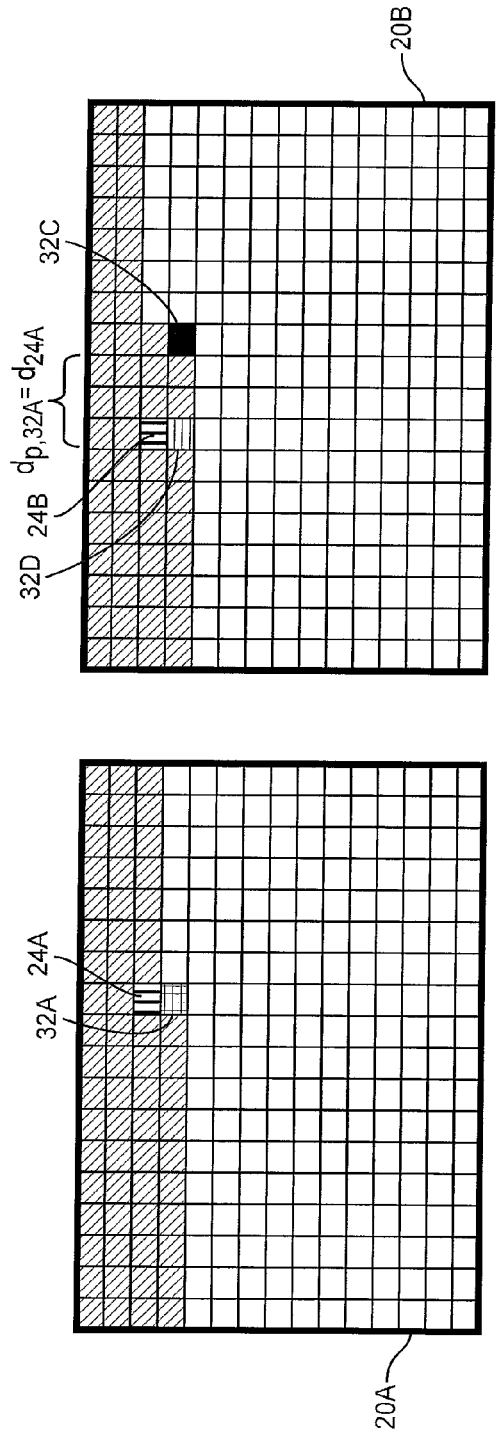
FIGS. 4A-4B illustrate an example of estimating a disparity map of a scene according to the method illustrated in FIG. 3.
Figure 4B:
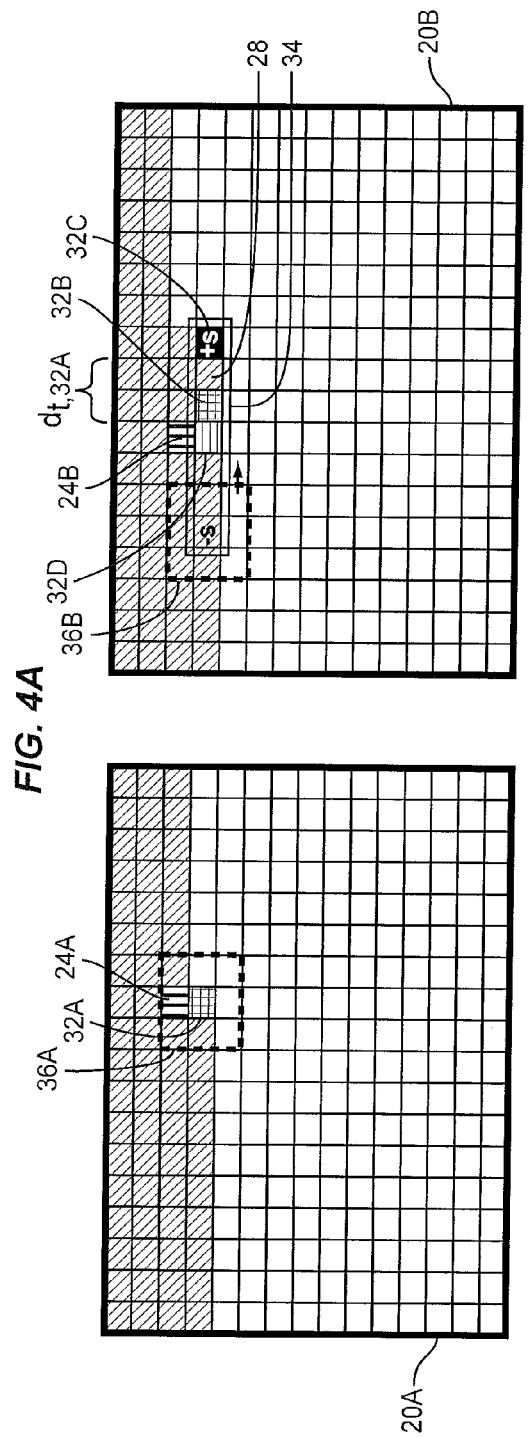

FIGS. 4A-4B provide a simple example of the illustrated image processing. In FIG. 4A, the image processing calculates a disparity $d_{24A}$ and an associated matching cost for a single pixel block, pixel block 24A, included in the reference image 20A at the pre-determined pixel block resolution, e.g., by searching for corresponding pixel block 24B in monoscopic image 20B over a full range of candidate pixel blocks. A pixel block 32A is also included in the reference image 20A at the pre-determined pixel block resolution and, in fact, neighbors pixel block 24A. The image processing predicts that the disparity $d_{32A}$ and the associated matching cost for this neighboring pixel block 32A will be similar to the disparity $d_{24A}$ and the associated matching cost for pixel block 24A. That is, the image processing predicts that pixel block 32D in image 20B will correspond to neighboring pixel block 32A, since it is the pixel block that has the same horizontal offset as the horizontal offset between corresponding pixel block 24B and pixel block 24A. In this example, the disparity predicted $d_{p,32A}$ for the neighboring pixel block 32A is equal to the disparity $d_{24A}$ calculated for pixel block 24A.

As shown in FIG. 4B, the image processing then calculates a tentative disparity $d_{t,32A}$ and an associated matching cost for neighboring pixel block 32A. To do so, the image processing searches for corresponding pixel block 32B in monoscopic image 20B over a reduced range 34 of candidate pixel blocks 28. The reduced range 34 is focused around the disparity predicted $d_{p,32A}$, as the reduced range 34 in this example extends symmetrically on either side of pixel block 32D, which was predicted as being the pixel block corresponding to neighboring pixel block 32A. Moreover, the reduced range 34 only extends on either side of pixel block 32D by ±s pixel blocks, where s<<D. The reduced range 34 therefore includes fewer candidate pixel blocks 28 than the full range of candidate pixel block 28 discussed above, meaning that a search of the reduced range requires less computational complexity than a similar search over the full range.

Regardless, the image processing searches for the corresponding pixel block 32B over the reduced range 34 by computing a matching cost for each candidate pixel block 28 included in the reduced range 34. In this example, the matching cost is a window-based matching cost between local window 36A, centered around the neighboring pixel block 32A in the reference image 20A, and sliding local window 36B, centered at any given time around the candidate pixel block 28 for which the matching cost is currently being computed. Accordingly, in FIG. 4B, computing a matching cost for each candidate pixel block 28 entails computing a matching cost for each of a plurality of windows 36 of pixel blocks, where each window includes two or more pixel blocks and a different one of the candidate pixel blocks 28.

Regardless of the specific type of matching cost, whether window-based or not, the matching cost indicates how similar or dissimilar the candidate pixel block 28 is to the neighboring pixel block 32A. The image processing then determines the corresponding pixel block as the candidate pixel block 28 with a matching cost indicating the most similarity to the neighboring pixel block 32A, which in this example is shown as being pixel block 32B. Having determined the corresponding pixel block 32B, the image processing calculates the tentative disparity $d_{t,32A}$ as the horizontal offset between the neighboring pixel block 32A and the corresponding pixel block 32B. The matching cost associated with this tentative disparity $d_{t,32A}$ is of course the matching cost computed for the corresponding pixel block 32B.

The image processing then determines the disparity $d_{32A}$ for neighboring pixel block 32A based on comparing the matching costs associated with the tentative disparity $d_{t,32A}$ and the disparity predicted $d_{p,32A}$ (i.e., based on comparing the matching cost computed for the corresponding pixel block 32B and the matching cost predicted for pixel block 32D). Assuming for this example that the matching costs are similar, the image processing would determine the disparity $d_{32A}$ for neighboring pixel block 32A to be the tentative disparity $d_{t,32A}$.

Figure 5:
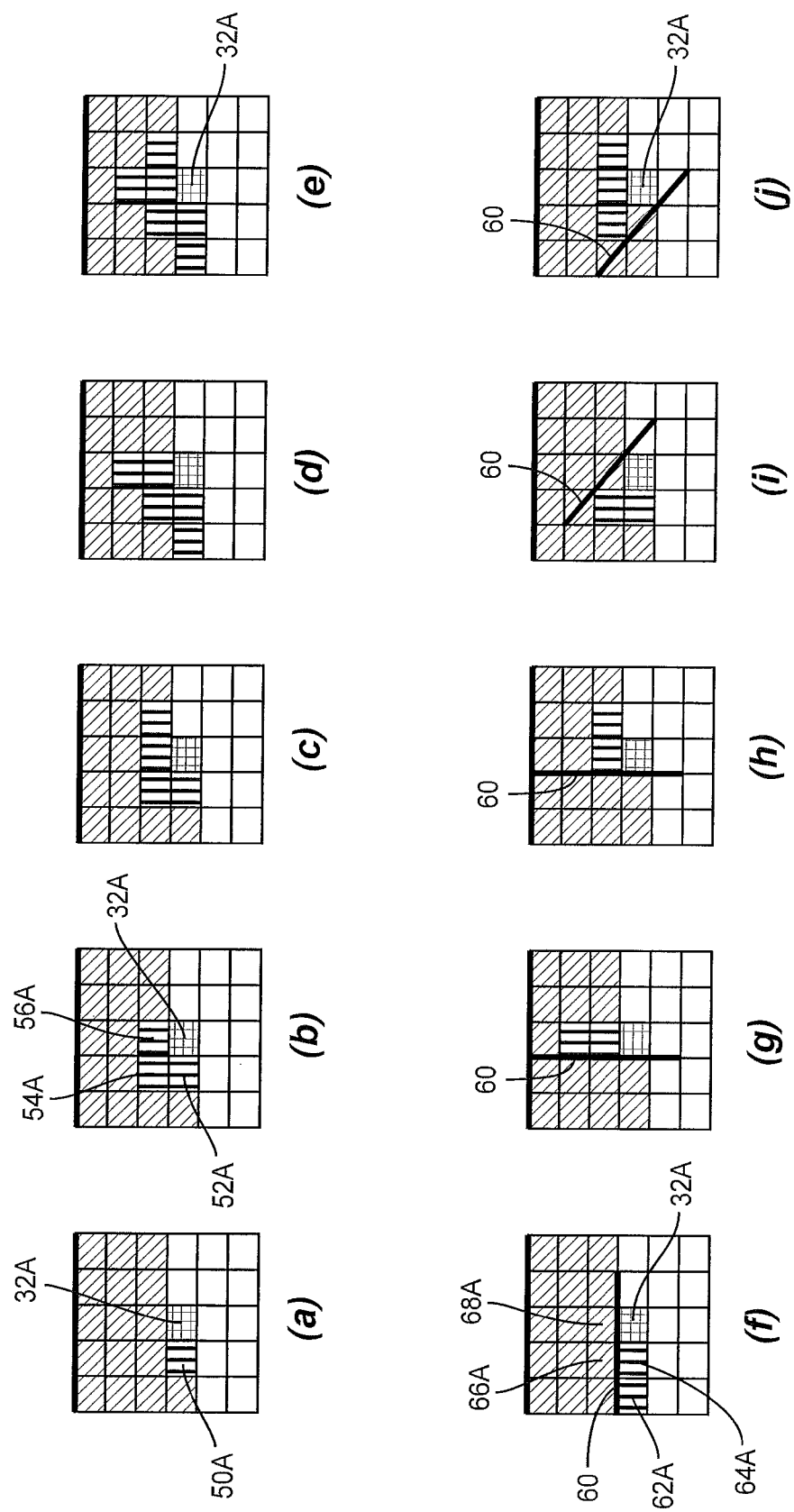
FIGS. 5(a)-(j) illustrate various embodiments for predicting the disparity of a neighboring pixel block, based on the disparity calculated for one or more other pixel blocks.

Of course, FIGS. 4A-4B show just one simple, non-limiting example of image processing according to the present invention. In particular, FIGS. 4A-4B show that image processing predicts the disparity and associated matching cost for a neighboring pixel block 32A based on the disparity and associated matching cost calculated for a single pixel block 24A positioned in the reference image 20A directly above the neighboring pixel block 32A. In other embodiments, however, image processing predicts the disparity and associated matching cost for a neighboring pixel block 32A based on the disparity and associated matching cost calculated for more than one pixel block and/or for pixel blocks not positioned in the reference image 20A directly above the neighboring pixel block 32A. Although also non-limiting in itself, FIG. 5 illustrates a few examples of these other embodiments.

As shown in FIG. 5(a), image processing may predict the disparity and associated matching cost for a neighboring pixel block 32A based on the disparity and associated matching cost calculated for a single pixel block 50A positioned in the reference image 20A directly to the left of the neighboring pixel block 32A. Moreover, FIG. 5(b) shows that image processing may also predicts the disparity and associated matching cost for a neighboring pixel block 32A based on the disparity and associated matching cost calculated for each of a plurality of pixel blocks 52A, 54A, and 56A included in the reference image 20A. In this case, image processing entails calculating a disparity and an associated matching cost for each of the plurality of pixel blocks 52A, 54A, and 56A, and then predicting the disparity and associated matching cost for the neighboring pixel block 32A according to some combination or function of the disparity and associated matching cost calculated for the pixel blocks 52A, 54A, and 56A. In one embodiment, for instance, image processing predicts the disparity and associated matching cost for the neighboring pixel block 32A as weighted averages of the disparity and associated matching cost, respectively, calculated for each of the pixel blocks 52A, 54A, and 56A. FIGS. 5(c)-5(e) show other embodiments of image processing that use a different number of pixel blocks for such disparity prediction and/or that use pixel blocks positioned differently for disparity prediction.

FIGS. 5(f)-5(j) show that image processing may also adaptively predict disparity based on some intensity edge 60 detected in the reference image 20A. That is, image processing may detect that a neighboring pixel block 32A is disposed on one side of an intensity edge 60. Pixel blocks disposed along the same side of the intensity edge 60 as the neighboring pixel block 32A provide the most accurate prediction of the disparity for the neighboring pixel block 32A. According to one embodiment, therefore, image processing includes predicting a disparity and an associated matching cost for the neighboring pixel block 32A as weighted averages of the disparity and the associated matching cost, respectively, calculated for each of the plurality of pixel blocks that is disposed along the same side of the intensity edge 60 as the neighboring pixel block 32A. For example, in FIG. 5(f), image processing may calculate a disparity and associated matching cost for each of pixel blocks 62A, 64A, 66A, and 68A. However, only pixel blocks 62A and 64A are disposed along the same side of the intensity edge 60 as neighboring pixel block 32A. Thus, image processing calculates the disparity and associated matching cost for neighboring pixel block 32A as weighed averages of the disparity and associated matching cost, respectively, calculated for pixel blocks 62A and 64A, not 66A or 68A. The remaining FIGS. 5(g)-5(j) show other embodiments of image processing upon the detection of an intensity edge 60.

Image processing may also discriminate against which of a plurality of pixel blocks to use for disparity prediction based on other factors. Indeed, in one embodiment, image processing calculates disparity for certain pixel blocks, such as those depicting corners of high contrast in the reference image 20A, using high confidence feature point matching. With such high confidence in the disparities determined for these pixel blocks, image processing may selectively prefer to predict the disparity of a neighboring pixel block with those of the plurality of pixel blocks having their disparity calculated by high confidence feature point matching.

With this in mind, those skilled in the art will appreciate that while the examples in FIGS. 4A-4B and FIG. 5 suggest estimating disparity starting with the upper-leftmost pixel block and moving across the reference image 20A from left to right and top to bottom, the present invention is not limited to this case. In some embodiments, for instance, disparity is first estimated for some pixel blocks in the reference image 20A using high confidence feature point matching, whereupon disparity estimation proceeds out in one or more directions starting from those pixel blocks.

Figure 6:
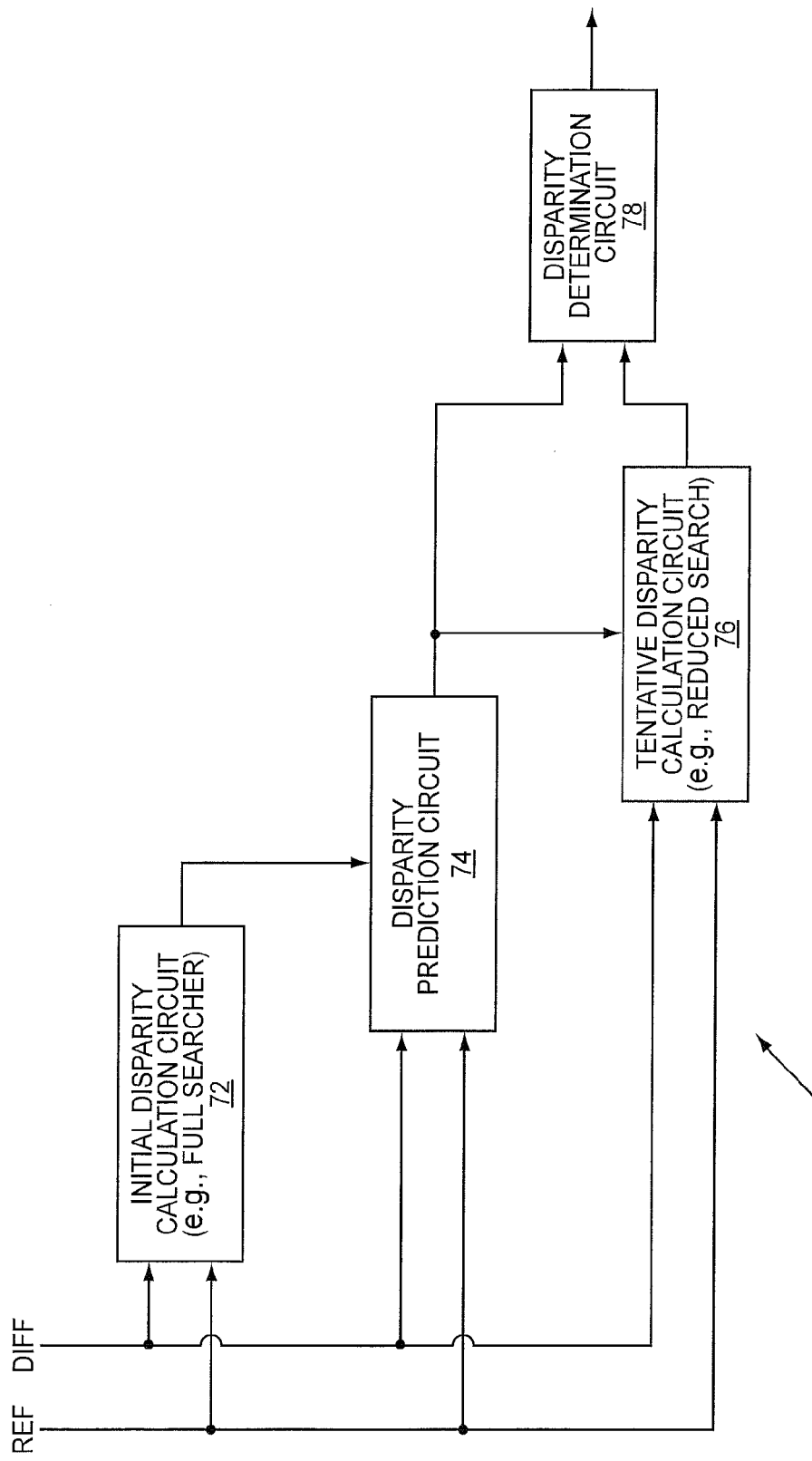
FIG. 6 is a functional block diagram of one or more image processing circuits configured to perform the method illustrated in FIG. 3.

Regardless, one or more image processing circuits may be configured to carry out the image processing described above, as illustrated in FIG. 6. As shown in FIG. 6, one or more image processing circuits 70 may include an initial disparity calculation circuit 72, a disparity prediction circuit 74, a tentative disparity calculation circuit 76, and a disparity determination circuit 78. The initial disparity calculation circuit 72 is configured to calculate a disparity and an associated matching cost for at least one pixel block included in the reference image Ref at a pre-determined pixel block resolution, such as by searching for a corresponding pixel block in a different monoscopic image Diff over a full range of candidate pixel blocks. Regardless, the initial disparity calculation circuit 72 provides the disparity and associated matching cost calculated to the disparity prediction circuit 74. Based on this information, the disparity prediction circuit 74 predicts a disparity and an associated matching cost for a pixel block that is also included in the reference image Ref at the pre-determined pixel block resolution and that neighbors the at least one pixel block. The disparity prediction circuit 74 in turn provides this prediction to the tentative disparity calculation circuit 76. Based on the prediction, the tentative disparity calculation circuit 76 calculates a tentative disparity and an associated matching cost for the neighboring pixel block. To do so, the tentative disparity calculation circuit 76 searches for a corresponding pixel block in the different monoscopic image Diff over a reduced range of candidate pixel blocks, where the reduced range is focused around the disparity predicted. Accepting as input the tentative disparity and associated matching cost, as well as the predicted disparity and associated matching cost, the disparity determination circuit 78 determines a disparity for the neighboring pixel block based on comparing the matching costs associated with the tentative disparity and the disparity predicted.

Those skilled in the art will appreciate that the various "circuits" described may refer to a combination of analog and digital circuits, including one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Furthermore, those skilled in the art will appreciate that different sets of the one or more image processing circuits 70 (each set including different circuits 72, 74, 76, and 78) may be deployed across multiple processor cores, or multiple graphical processing units. Deployed across multiple processor cores or units, the image processing circuits 70 may estimate a disparity map of a scene 10 by estimating different parts of the disparity map in parallel. More particularly, image processing across the image processing circuits 70 in one embodiment entails dividing each of the plurality of monoscopic images of the scene 10 into a pre-determined number of respective image portions. Image processing continues by estimating the disparity map of the scene 10 by estimating, in parallel from the same pre-determined number of image processing circuits 70, disparity maps for the respective image portions. The respective image portions may include, for example, different patches (i.e., sub-images) of the scene, divided in both the horizontal and vertical direction, or alternatively different stripes of the scene, divided in the vertical direction only. Overlap may exist between the patches or stripes to enforce consistent estimation of disparity between them.

Those skilled in the art will also appreciate that, while the above embodiments have described estimating a disparity map of a scene 10 from monoscopic images 20A, 20B acquired from different visual perspectives of the scene 10, the present invention is not limited to this case. In other embodiments, for instance, image processing entails estimating a disparity map of a scene 10 from monoscopic images 20A, 20B acquired at different times, e.g., by a video camera capturing multiple frames of the scene 10 across time. In still other embodiments, image processing entails estimating a disparity map of a scene 10 from monoscopic images 20A, 20B acquired both from different visual perspectives of the scene 10 and at different times (e.g., where a camera captures the scene 10 while moving through the scene 10 over time, as in the case of a robot moving through the scene 10). With this in mind, those skilled in the art will appreciate that the disparity prediction described above may occur spatially and/or temporally.

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method implemented by one or more image processing circuits for estimating a disparity map of a scene from a plurality of monoscopic images of that scene, each monoscopic image including a plurality of pixel blocks of one or more pixels and one of the monoscopic images being defined as a reference image, the method comprising:
    calculating a disparity and an associated matching cost for at least one pixel block included in the reference image at a pre-determined pixel block resolution;
    predicting, based on the disparity and the associated matching cost calculated for said at least one pixel block, a disparity and an associated matching cost for a pixel block that is also included in the reference image at the pre-determined pixel block resolution and that neighbors said at least one pixel block;
    calculating a tentative disparity and an associated matching cost for said neighboring pixel block based on the disparity predicted, by searching for a corresponding pixel block in a different monoscopic image over a reduced range of candidate pixel blocks in said different monoscopic image, the reduced range being focused around the disparity predicted; and
    determining a disparity for said neighboring pixel block based on comparing the matching costs associated with the tentative disparity and the disparity predicted.

2. The method of claim 1, wherein searching over a reduced range of candidate pixel blocks comprises searching over a range that is reduced as compared to a full range of candidate pixel blocks, the full range including a number of candidate pixel blocks approximately equal to a maximum possible disparity for said scene.

3. The method of claim 1, wherein determining a disparity for said neighboring pixel block based on comparing the matching costs associated with the tentative disparity and the disparity predicted comprises determining a disparity for said neighboring pixel block as the tentative disparity, if the difference between the matching cost associated with the tentative disparity and the matching cost associated with the disparity predicted is less than or equal to a pre-determined threshold.

4. The method of claim 1, wherein determining a disparity for said neighboring pixel block based on comparing the matching costs associated with the tentative disparity and the disparity predicted comprises calculating a disparity for said neighboring pixel block, by searching for a corresponding pixel block in said different monoscopic image over a full range of candidate pixel blocks in said different monoscopic image, if the difference between the matching cost associated with the tentative disparity and the matching cost associated with the disparity predicted is greater than a pre-determined threshold.

5. The method of claim 1, wherein calculating a disparity and an associated matching cost for at least one pixel block included in the reference image at the pre-determined pixel block resolution comprises calculating a disparity and an associated matching cost for each of a plurality of pixel blocks included in the reference image at the pre-determined pixel block resolution, and wherein predicting a disparity and an associated matching cost for a pixel block that neighbors said at least one pixel block comprises predicting a disparity and an associated matching cost for a pixel block that neighbors at least one of the plurality of pixel blocks as weighted averages of the disparity and the associated matching cost, respectively, calculated for each of said plurality of pixel blocks.

6. The method of claim 5, further comprising detecting that said neighboring pixel block is disposed on one side of an intensity edge, and wherein predicting a disparity and an associated matching cost for a pixel block that neighbors at least one of the plurality of pixel blocks comprises predicting a disparity and an associated matching cost for the neighboring pixel block as weighted averages of the disparity and the associated matching cost, respectively, calculated for each of said plurality of pixel blocks that is also disposed along said one side of said intensity edge.

7. The method of claim 1, wherein calculating a disparity and an associated matching cost for at least one pixel block included in the reference image at the pre-determined pixel block resolution comprises searching for a corresponding pixel block in said different monoscopic image over a full range of candidate pixel blocks in said different monoscopic image.

8. The method of claim 1, wherein calculating a tentative disparity and an associated matching cost for said neighboring pixel block based on the disparity predicted, by searching for a corresponding pixel block in a different monoscopic image over a reduced range of candidate pixel blocks in said different monoscopic image comprises:
  computing a matching cost for each candidate pixel block included in said reduced range, the matching cost indicating how similar or dissimilar the candidate pixel block is to said neighboring pixel block;
  determining the corresponding pixel block as the candidate pixel block with a matching cost indicating the most similarity to said neighboring pixel block; and
  calculating the tentative disparity for said neighboring pixel block as the horizontal offset between said neighboring pixel block and said corresponding pixel block, and the associated matching cost as the matching cost computed for the corresponding pixel block.

9. The method of claim 8, wherein computing a matching cost for each candidate pixel block included in said reduced range comprises computing a matching cost for each of a plurality of windows of pixel blocks, each window of pixel blocks comprising two or more pixel blocks and including a different one of the candidate pixel blocks.

10. The method of claim 1, wherein the plurality of monoscopic images of the scene comprise at least one of:
  a plurality of images acquired from different visual perspectives of the scene; and
  a plurality of images acquired at different times.

11. The method of claim 1, wherein calculating a disparity and an associated matching cost for at least one pixel block included in the reference image at the pre-determined pixel block resolution comprises calculating a disparity and an associated matching cost for each of a plurality of pixel blocks included in the reference image at the pre-determined pixel block resolution, and wherein predicting a disparity and an associated matching cost for a pixel block that neighbors said at least one pixel block comprises predicting a disparity and an associated matching cost for said neighboring pixel block as the disparity and the associated matching cost calculated for those of the plurality of pixel blocks having their disparity calculated by high confidence feature point matching.

12. The method of claim 1, further comprising dividing each of the plurality of monoscopic images into a pre-determined number of respective image portions, and estimating the disparity map of the scene by estimating, in parallel from the same pre-determined number of image processing circuits, disparity maps for the respective image portions.

13. An apparatus configured to estimate a disparity map of a scene from a plurality of monoscopic images of that scene, each monoscopic image including a plurality of pixel blocks of one or more pixels and one of the monoscopic images being defined as a reference image, the apparatus comprising one or more image processing circuits configured to:
  calculate a disparity and an associated matching cost for at least one pixel block included in the reference image at a pre-determined pixel block resolution;
  predict, based on the disparity and the associated matching cost calculated for said at least one pixel block, a disparity and an associated matching cost for a pixel block that is also included in the reference image at the pre-determined pixel block resolution and that neighbors said at least one pixel block;
  calculate a tentative disparity and an associated matching cost for said neighboring pixel block based on the disparity predicted, by searching for a corresponding pixel block in a different monoscopic image over a reduced range of candidate pixel blocks in said different monoscopic image, the reduced range being focused around the disparity predicted; and
  determine a disparity for said neighboring pixel block based on comparing the matching costs associated with the tentative disparity and the disparity predicted.

14. The apparatus of claim 13, wherein the one or more image processing circuits are configured to search over a range that is reduced as compared to a full range of candidate pixel blocks, the full range including a number of candidate pixel blocks approximately equal to a maximum possible disparity for said scene.

15. The apparatus of claim 13, wherein the one or more image processing circuits are configured to determine a disparity for said neighboring pixel block as the tentative disparity, if the difference between the matching cost associated with the tentative disparity and the matching cost associated with the disparity predicted is less than or equal to a pre-determined threshold.

16. The apparatus of claim 13, wherein the one or more image processing circuits are configured to calculate a disparity for said neighboring pixel block by searching for a corresponding pixel block in said different monoscopic image over a full range of candidate pixel blocks in said different monoscopic image, if the difference between the matching cost associated with the tentative disparity and the matching cost associated with the disparity predicted is greater than a pre-determined threshold.

17. The apparatus of claim 13, wherein the one or more image processing circuits are configured to calculate a disparity and an associated matching cost for each of a plurality of pixel blocks included in the reference image at the pre-determined pixel block resolution, and to predict a disparity and an associated matching cost for a pixel block that neighbors at least one of the plurality of pixel blocks as weighted averages of the disparity and the associated matching cost, respectively, calculated for each of said plurality of pixel blocks.

18. The apparatus of claim 17, wherein the one or more image processing circuits are further configured to detect that said neighboring pixel block is disposed on one side of an intensity edge, and to predict a disparity and an associated matching cost for the neighboring pixel block as weighted averages of the disparity and the associated matching cost, respectively, calculated for each of said plurality of pixel blocks that is also disposed along said one side of said intensity edge.

19. The apparatus of claim 13, wherein the one or more image processing circuits are configured to calculate a disparity and an associated matching cost for at least one pixel block included in the reference image at the pre-determined pixel block resolution by searching for a corresponding pixel block over a full range of candidate pixel blocks in said different monoscopic image.

20. The apparatus of claim 13, wherein the one or more image processing circuits are configured to calculate a tentative disparity and an associated matching cost for said neighboring pixel block based on the disparity predicted, by searching for a corresponding pixel block in a different monoscopic image over a reduced range of candidate pixel blocks in said different monoscopic image, by:
  computing a matching cost for each candidate pixel block included in said reduced range, the matching cost indicating how similar or dissimilar the candidate pixel block is to said neighboring pixel block;

determining the corresponding pixel block as the candidate pixel block with a matching cost indicating the most similarity to said neighboring pixel block; and calculating the tentative disparity for said neighboring pixel block as the horizontal offset between said neighboring pixel block and said corresponding pixel block, and the associated matching cost as the matching cost computed for the corresponding pixel block.

21. The apparatus of claim 20, wherein the one or more image processing circuits are configured to compute a matching cost associated with each candidate pixel block included in said reduced range by computing a matching cost for each of a plurality of windows of pixel blocks, each window of pixel blocks comprising two or more pixel blocks and including a different one of the candidate pixel blocks.

22. The apparatus of claim 13, wherein the plurality of monoscopic images of the scene comprise at least one of:
a plurality of images acquired from different visual perspectives of the scene; and
a plurality of images acquired at different times.

23. The apparatus of claim 13, wherein the one or more image processing circuits are configured to calculate a disparity and an associated matching cost for at least one pixel block included in the reference image at the pre-determined pixel block resolution by calculating a disparity and an associated matching cost for each of a plurality of pixel blocks included in the reference image at the pre-determined pixel block resolution, and to predict a disparity and an associated matching cost for a pixel block that neighbors said at least one pixel block by predicting a disparity and an associated matching cost for said neighboring pixel block as the disparity and the associated matching cost calculated for those of the plurality of pixel blocks having their disparity calculated by high confidence feature point matching.

24. The apparatus of claim 13, wherein the one or more image processing circuits comprise a pre-determined number of image processing circuits greater than one, and wherein the image processing circuits are configured to divide each of the plurality of monoscopic images into the same pre-determined number of respective image portions and to estimate the disparity map of the scene by estimating, in parallel from the image processing circuits, disparity maps for the respective image portions.

* * * * *